Oct. 7, 1969  F. A. CHARDON  3,471,785
SYNCHRONOUS MOTOR ROTARY INDICATOR
Filed Jan. 15, 1968

INVENTOR
FELIX A. CHARDON
BY Harold W. Adams
ATTORNEY

United States Patent Office 3,471,785
Patented Oct. 7, 1969

3,471,785
SYNCHRONOUS MOTOR ROTARY INDICATOR
Felix A. Chardon, 32 Chapel Road,
New Hope, Pa. 18938
Filed Jan. 15, 1968, Ser. No. 697,935
Int. Cl. G01r 7/02
U.S. Cl. 324—140                                      3 Claims

ABSTRACT OF THE DISCLOSURE

A rotary indicator for sensing and displaying a function of a plurality of input signals comprising: a permanent bipolar magnet rotor within a rotary multiphase stator assembly, the stator assembly including a field coil for each of said phases, the number of phases corresponding to the number of input signals. The magnetic rotor includes viscous damping means, and, due to the damping and mechanical inertia of the magnetic rotor, the rotor is displaced by the resulting magnetic field. The degree of rotational displacement being a function of the vector sum of the respective signal inputs. The magnetic rotor carries a pointer over a calibrated and adjustable dial visually indicating the displacement of the magnetic rotor. Manual adjustment means are provided for rotating the stator assembly relative to the rotor to preset the rotor and pointer independently of the input signals, which may be either AC or DC and applied simultaneously or sequentially.

---

An object of this invention is to provide a rotary indicator for sensing and visually indicating the function of a plurality of signal inputs including a magnetic rotor, a multiphase stator and means for adjustably positioning the stator to preset the rotor for any given signal input.

Another object of this invention is to provide a rotary indicator of the synchronous motor type and including a calibrated dial, a pointer carried by a rotor and a means for adjustably positioning a multiphase stator relative to the rotor to preset the pointer.

Still another object of this invention is to provide a rotary indicator of the synchronous motor type including a multiphase stator, a permanent magnet rotor and viscous damping means for regulating the rotor displacement response time for a given degree of angular displacement as determined by a plurality of input signals applied to said field coils of said multiphase stator.

Yet another object of this invention is to provide a rotary indicator of the synchronous motor type including a permanent bipolar magnet; a manually adjustable multiphase stator and switching means for sequentially applying a plurality of respective input signals to the respective phase of said stator, and a calibrated dial including means for adjusting said dial relative to said rotor.

These and many other objects and advantages will become apparent from the following detailed description of a preferred embodiment of the invention when read in view of the appended drawings wherein.

Figure 1:
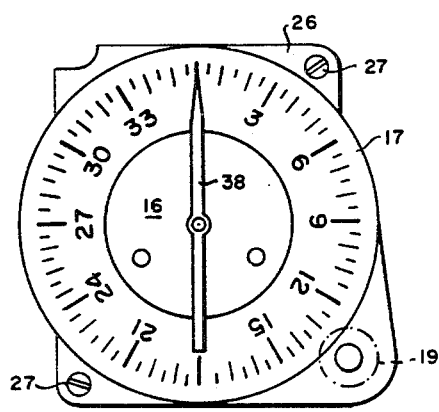
FIGURE 1 is a plan view of a rotary indicator in accordance with the principles of this invention illustrating a calibrated and adjustable dial and rotating pointer.
Figure 2:
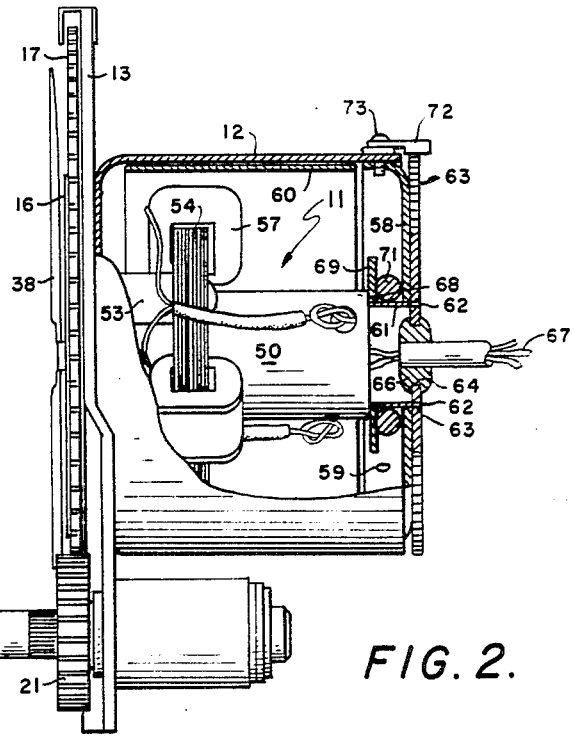
FIGURE 2 is a side elevational view of the rotary indicator shown partially in section illustrating a rotatable stator assembly, magnetic rotor, and zero reset means for angularly positioning the stator assembly relative to the rotor.
Figure 4:
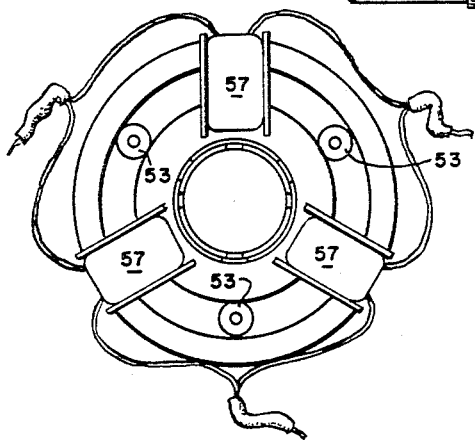
FIGURE 4 is an end view of the rotary indicator with the end plate removed illustrating the displacement of the stator assembly field coils.

Referring now to FIGURES 1 and 2 of the drawing, a preferred embodiment of the invention includes a synchronous motor designated generally by the reference number 11 supported within case 12, to one end of which is attached a base plate 13 and a fixed circular hub 16 which receives and spacedly supports a toothed and calibrated circular dial 17. Both the base plate 13 and hub 16 are attached to the end wall of the case 12 by means of suitable fasteners 18. The dial 17 is rotated on the hub 16 by means of an adjustment knob 19 on shaft 20 splined to gear 21 which meshes with the toothed dial 17. The base plate 13, hub 16 and dial 17 are housed in a cover 24 attached to the base plate 13. The cover 24 is provided with shoulders 26 which receive screws 27 or other fasteners for mounting the instrument and includes a transparent face 28 for exposing the dial face. As shown in FIGURE 2 the dial drive gear 21 is also encased in the cover 24.

Figure 3:
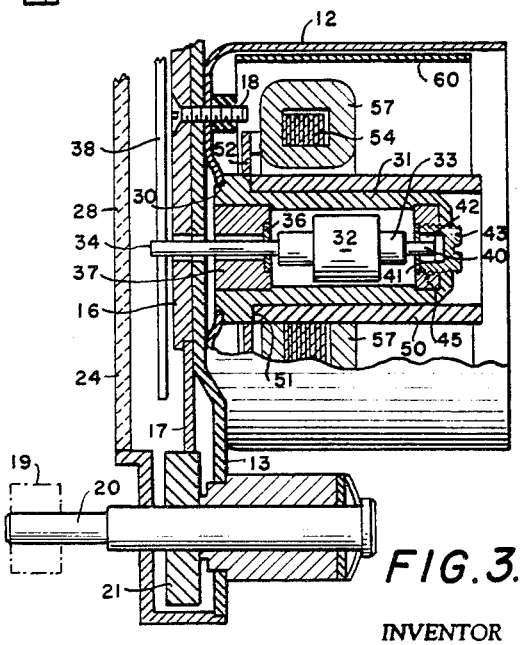
FIGURE 3 is a cross sectional view along the lines 3—3 of FIGURE 1 illustrating the stator assembly, rotor and dial control mechanism in greater detail.

Referring now to FIGURE 3, the end wall of the case 12 is provided with a circular opening 30, the center of which lies on the longitudinal axis of the case 12 and rigidly supports a hollow cylindrical rotor housing 31 formed of brass in which is mounted a bipolar magnet rotor 32 mounted on shaft 33. One end 34 of the shaft 33 extends through a ring jewel 36 within a brass plug 37 closing the mouth of rotor housing 31, the base plate 13 and hub 16 and carries a pointer 38.

At the opposite end 40 the rotor shaft 33 is reduced in diameter and extends through ring jewel 41 into cavity 42 within a hollow set screw 43 threadably received in a brass end plug 45 within the rotor housing 31. The end 40 of the rotor shaft 33 rests on a jewel bearing 44. Ring jewel 41 seals the cavity 42, which is filled with a suitable damping fluid such as silicone. The viscosity of the damping fluid determines the response time required for a given rotation or displacement of the rotor and prevents over shooting and hunting.

The stator assembly comprises a cylindrical spindle 50 rotatively mounted on the rotor housing 31 and spaced from the end wall of the case 12 by means of a shoulder 51 formed on the rotor housing 31. A circular plate 52 attached to the spindle 50 carries three insulated spacers 53 equally spaced about the periphery of the plate at 120°. A circular laminated magnetic core 54 is rigidly attached to the end faces of the insulated spacers 53 by means of suitable fasteners 56. The laminated magnetic core 54 passes through three matched field coils 57 equally spaced about the circular core 54 at 120° intervals. The field coils 57 are connected in a delta configuration.

A flanged end plate 58 received within the casing 12 is secured by set screws 59. An aluminum magnetic shield 60 surrounds the stator assembly to prevent spurious magnetic fields from effecting the instrument. A reduced end portion 61 of the spindle is provided with lugs 62 which extend through a central opening 63 in the end plate 58. The lugs 62 on the spindle are received and secured within equally spaced apertures in a brass zero adjust ring 63 toothed about its periphery. The zero adjust ring 63 is provided with a central aperture 64 which receives an insulating grommet 66 through which three insulated electrical conductors 67, one for each field coil, are brought out. The reduced end portion of the spindle forms a shoulder 68 that supports a washer 69 compressing an O ring 71 positioned between the washer and the end plate 58. As can be seen, rotation of the zero adjust ring 63 rotates the entire stator assembly including the laminated core 54 and the spaced field coils 57 about the rotor 31. A lug 72 is secured to the case 12 by means of a screw or other suitable fastener 73 provided for locking the zero adjust ring 63 into position.

Figure 5:
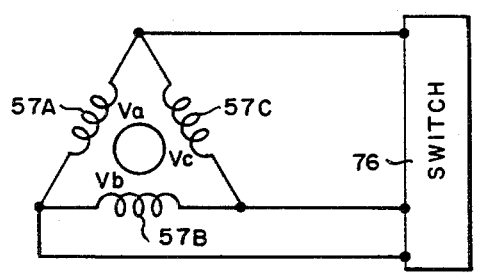
FIGURE 5 is an electrical diagram of the rotary indicator.

As shown in FIGURE 5, the equally spaced field coils 57 are connected in a delta configuration and brought out to receive three signal inputs fed to the respective field coils 57–A, 57–B, and 57–C. The input signals may be either AC or DC and applied to the respective field coils either simultaneously or sequentially. In a preferred embodiment a switch 76 is provided for sequentially and in seriation applying the voltages V$a$, V$b$ and V$c$ to the respective coils A, B and C.

The magnetic field generated when the field coils are energized by the input signals causes the rotor and pointer to rotate and assume a position which is a function of the relative voltages applied to the respective field coils. In this instance, the angular displacement of the rotor and thus of the pointer about the calibrated dial is the vector sum of the magnitude of the respective input voltages V$a$, V$b$ and V$c$. The viscosity of the damping fluid and the mechanical inertia of the system determines the time required for a given angular displacement of the rotor.

The zero adjust ring 63 may be driven by motor means or manually adjusted, to set the rotor and pointer in a zero or any other desired position for any signal input without disassembly. The front adjustment knob permits the calibrated dial to also be preset for any given position of the pointer and rotor.

Although the rotary indicator of this invention is presently used in an automatic direction finder for aircraft and marine navigation for visually displaying the angular location of a particular radio beacon in an azimuth angle relative to the aircraft or vehicle, it may readily be employed in other applications where required to visually display the function of a plurality of input voltages. Such applications are liquid level or quantity measurements, angular position of flaps or controls of aircraft, pressure or temperature measurements in any display requiring a rotating needle pointer with a zero or prepositioning feature.

What is claimed is:

1. A rotary indicator for visually displaying a function of a plurality of input signals comprising: a casing; a rotor housing in said casing; a magnetic rotor supported in said housing; a spindle rotatively mounted on said rotor housing, said spindle extending from said casing; a circular core of magnetic material rigidly affixed to said spindle and disposed around said rotor housing; a plurality of field coils equally spaced on said circular core forming a multiphase stator, the number of phases of said stator corresponding to the number of input signals thereto; an adjustable and calibrated dial affixed to said case; a pointer affixed to said rotor and rotatively disposed relative to said dial; means for applying a plurality of input signals to the coils of said multiphase stator; an adjustable ring affixed to said spindle; and means for locking said adjustable ring relative to said casing thereby positioning said coils of said multiphase stator relative to said rotor and pointer.

2. Apparatus as defined in claim 1 wherein three field coils are spaced at 120° intervals on said core and interconnected in a delta configuration.

3. Apparatus as defined in claim 1 including switch means for sequentially applying said input signals to said field coils.

References Cited
UNITED STATES PATENTS

| | | | |
|---|---|---|---|
| 2,345,936 | 4/1944 | Jewell | 324—140 XR |
| 2,396,538 | 3/1946 | Schmied. | |
| 2,509,485 | 5/1950 | Dalzell | 324—115 XR |
| 2,570,125 | 10/1951 | Hoare et al. | 324—125 XR |

ALFRED E. SMITH, Primary Examiner

U.S. Cl. X.R.

324—154